United States Patent [19]

Safadi

[11] Patent Number: 5,696,765
[45] Date of Patent: *Dec. 9, 1997

[54] CONFIGURABLE HYBRID MEDIUM ACCESS CONTROL FOR CABLE METROPOLITAN AREA NETWORKS

[75] Inventor: Reem Safadi, Horsham, Pa.

[73] Assignee: General Instrument Corporation, Hatboro, Pa.

[*] Notice: The term of this patent shall not extend beyond the expiration date of Pat. No. 5,572,517.

[21] Appl. No.: 697,056

[22] Filed: Aug. 19, 1996

Related U.S. Application Data

[63] Continuation of Ser. No. 402,007, Mar. 10, 1995, Pat. No. 5,572,517, which is a continuation-in-part of Ser. No. 395,325, Feb. 28, 1995.

[51] Int. Cl.$^6$ .................................................. H04J 4/00
[52] U.S. Cl. ...................... 370/436; 370/442; 370/449; 370/478; 370/487; 340/825.08; 375/257; 455/5.1; 348/12; 348/17
[58] Field of Search ........................ 370/24, 30, 50, 370/71, 73, 124, 82, 83, 79, 85.1, 85.2, 85.7, 85.8, 85.9, 95.1, 95.2, 95.3, 276, 295, 431, 432, 436, 442, 443, 449, 478, 485, 486, 487; 375/257; 455/3.1, 5.1; 340/825.08; 348/6, 10, 12, 13, 17, 14

[56] References Cited

U.S. PATENT DOCUMENTS

| | | | |
|---|---|---|---|
| 3,803,491 | 4/1974 | Osborn | 325/53 |
| 4,079,452 | 3/1978 | Larson et al. | 395/831 |
| 4,245,245 | 1/1981 | Matsumoto et al. | 358/122 |
| 4,347,604 | 8/1982 | Saito et al. | 370/85 |
| 4,494,111 | 1/1985 | Rocci et al. | 455/3.1 X |
| 4,533,948 | 8/1985 | McNamara et al. | 358/122 |
| 4,638,356 | 1/1987 | Frezza | 358/118 |
| 4,677,685 | 6/1987 | Kurisv | 455/4 |

(List continued on next page.)

FOREIGN PATENT DOCUMENTS

| | | | |
|---|---|---|---|
| 0353383 | 2/1990 | European Pat. Off. | G06F 13/38 |
| 2529739 | 1/1984 | France | H04N 7/10 |
| WO9212599 | 7/1992 | WIPO | H04N 7/173 |
| WO9427407 | 11/1994 | WIPO | H04N 7/173 |

OTHER PUBLICATIONS

Joseph et al., Prioritzation and Transport in the ADTV Digital Simulcast System, 1992.

Karshmer, On Implementing Computer Networking on Existing Cable TV Plants: Some Interesting Proposals, 1994.

Yum et al., Dynamic Channel Assignment in Integrated-Services Cable Networks, 1991.

Primary Examiner—Douglas W. Olms
Assistant Examiner—Russell W. Blum
Attorney, Agent, or Firm—Volpe and Koenig, P.C.

[57] ABSTRACT

The hybrid medium access control MAC system is configurable to the type of communication required to support a desired application or service. The MAC system analyzes services requested from a settop terminal, or a network controller client, and determines the best MAC component for transmitting signals upstream based on the resources required by the service and the available network resources. A portion of the upstream channel spectrum is allocated to each of the MAC components: 1) POP; 2) assigned static TDMA; 3) assigned dynamic multi-rate TDMA; and 4) random slot reservation-dynamic slot allocation TDMA. Depending upon the communication requirements of the service desired, the configurable MAC system will select the MAC component best suited to support the service. A frequency agile transmitter is then tuned to the channel which has been preallocated for the selected MAC component(s). As communication traffic varies over time, the system reallocates portions of the upstream channel spectrum among the different MAC components and may also reconfigure a specific MAC component.

6 Claims, 9 Drawing Sheets

OTHER PUBLICATIONS

| | | | |
|---|---|---|---|
| 4,689,619 | 8/1987 | O'Brien, Jr. | 340/825.08 |
| 4,710,955 | 12/1987 | Kauffman | 380/10 |
| 4,712,239 | 12/1987 | Frezza et al. | 380/20 |
| 4,755,995 | 7/1988 | Anderson et al. | 395/183.07 |
| 4,882,730 | 11/1989 | Shinmyo | 370/95.2 |
| 4,958,381 | 9/1990 | Toyosima | 340/825.08 X |
| 5,003,591 | 3/1991 | Kauffman et al. | 380/10 |
| 5,054,911 | 10/1991 | Ohishi et al. | 356/5 |
| 5,142,680 | 8/1992 | Ottman et al. | 330/66 |
| 5,155,837 | 10/1992 | Liv et al. | 395/500 |
| 5,225,902 | 7/1993 | McMullan, Jr. | 358/86 |
| 5,261,055 | 11/1993 | Moran et al. | 375/858 |
| 5,280,627 | 1/1994 | Flaherty et al. | 395/700 |
| 5,343,240 | 8/1994 | Yu | 348/14 |
| 5,359,730 | 10/1994 | Marron | 395/650 |
| 5,408,260 | 4/1995 | Arnon | 348/6 |
| 5,410,703 | 4/1995 | Nilsson et al. | 395/700 |
| 5,550,578 | 8/1996 | Hoarty et al. | 348/12 |
| 5,555,418 | 9/1996 | Nillsson et al. | 395/700 |
| 5,572,517 | 11/1996 | Safadi | 370/50 |

CONFIGURABLE HYBRID MEDIUM ACCESS CONTROL FOR CABLE METROPOLITAN AREA NETWORKS

CROSS-REFERENCE TO RELATED APPLICATION

This is a continuation of application Ser. No. 08/402,007, now U.S. Pat. No. 5,572,517, filed on Mar. 10, 1995 which is a continuation-in-part to application Ser. No. 08/395,325 filed Feb. 28, 1995, entitled DISTRIBUTED SYSTEM ARCHITECTURE FOR DIGITAL BROADCAST AND INTERACTIVE SERVICES to Reem Safadi, currently pending. This application is also related to co-pending application Ser. No. 08/402,027 filed Mar. 10, 1995, entitled ADAPTIVE PROTOCOL COMMUNICATION SYSTEM to Reem Safadi which is incorporated by reference as if fully set forth herein.

BACKGROUND OF THE INVENTION

1. Field of the Invention

This invention relates generally to cable television communication systems. More particularly, the invention relates to a cable television communication system having a configurable hybrid medium access control system which facilitates efficient use of the upstream bandwidth in bi-directional cable television systems and equitable upstream channel access for communicating entities.

2. Description of Related Art

Cable television (CATV) communication systems have traditionally comprised uni-directional systems which primarily provide video programming services to individual homes. These systems only permit communications in a downstream direction from the headend of a CATV system to the plurality of settop terminals in individual homes. However, bi-directional CATV communication systems have become increasingly standard, and almost necessary, as the popularity and diversity of interactive services has grown, such as pay per view (current) and interactive banking and home shopping (near future). Bi-directional CATV systems support both downstream and upstream communication. Individual subscribers, through the use of a settop terminal coupled to a television may communicate with the headend, other subscribers or service providers within the system. These systems also permit subscribers to select specific video programming or consumer services and pay only for those services which are used. Other services requiring the use of upstream communication channels include medical, fire and burglar alarm services, subscriber polling and telemetry such as utility meter reading.

To facilitate a bi-directional communication flow, the frequency spectrum of the cable is divided into a downstream path originating at the headend and an upstream path originating at the settop terminals. In order to effectively utilize the upstream bandwidth, bi-directional CATV communication systems require medium access control (MAC) for coordinating the upstream transmissions from various settop terminals. Without such coordination, simultaneous upstream transmissions from the settop terminals will cause the signals to collide, resulting in an unintelligible signal and loss of data from all transmissions.

Traditional medium access control methods include plain old polling (POP), random access as in ALOHA, static time division multiple access, dynamic time division multiple access and multiple access with collision detection (MACD). These are examples of MAC in satellite channels or other systems with shared media. Each MAC method has throughput and access delay characteristics associated with the method employed.

Plain old polling (POP) is implemented by a network controller within the CATV headend which communicates with a plurality of settop terminals. When a settop terminal requires a service, a message or flag is placed in the transmit queue within the settop terminal. A polling cycle is initiated periodically by the network controller to empty the transmit queue of each settop terminal. The network controller interrogates in succession every settop terminal on the shared communication medium served by the network controller to determine which of the terminals are in need of services. This method is intended for applications that benefit from a store and forward system, where collisions in the upstream bandwidth are expected but latencies associated with the POP response delivery are irrelevant. In addition, it facilitates controlled communications for any diagnostic operation.

The disadvantage with POP is that it exhibits poor performance in terms of network efficiency, especially when a small subset of the settop terminals require access to the channel during a polling cycle. Further, the method is not suitable for connection-orientated services which require guaranteed bandwidth since the settop terminal may be subject to variable latencies in upstream channel access. This type of MAC is least suitable for interactive services.

In time division multiple access (TDMA), an upstream carrier frequency is formatted as a tightly synchronized series of repeating frames, each frame being divided into a number of time slots. Each time slot carries communications pertaining to a single settop terminal. Since the synchronization of the time frames is critical, the communicating entities, including the headend and all settop terminals, must be synchronized.

TDMA may be either static, dynamic or multiple access with collision detection. In the static (or fixed cycle) TDMA method, each settop terminal has a pre-allocated transmission time slot during which it may access the upstream channel. In this case, the CATV communication system is only capable of supporting the same number of settop terminals as the number of time slots, if each settop terminal is permitted to reserve only a single time slot per frame. Time slots must be used as assigned to prevent any transmission overlap from different settop terminals. This method has the advantage of providing guaranteed latency per cycle.

The disadvantage with static TDMA is that the cycle time, the duration between frames, is bound to be longer than necessary since each settop terminal is pre-assigned a time slot whether it needs the time slot or not. If on the average only ten percent of the terminals communicate at any given time, then ninety percent of the available channel capacity is wasted. Since the method is static, the cycle duration cannot improve over that which presently exists (slot-time ×total number of terminals).

In the dynamic (variable cycle) TDMA method, time slots are allocated as demanded by individual settop terminals. A random time slot is reserved by the settop terminal that wishes to initiate communications. The network controller dynamically allocates the available time slots as requests are received from settop terminals. The dynamic allocation of time slots optimizes the use of the available bandwidth. However, the disadvantage with dynamic TDMA is that settop terminals may be forced to wait for a time slot when multiple settop terminals are competing for a fewer number of available time slots. Thus, the settop terminals experience a delay prior to the allocation of a time slot by the network controller. There is a point of diminishing returns for dynamic TDMA when the average access delay due to multiple terminals attempting to reserve the same time slot becomes greater than the fixed TDMA cycle duration.

Carrier sense multiple access with collision detection (CSMA/CD) is a random access mechanism with no knowledge of the order of transmissions (this is the access scheme used in an Ethernet local area network). The carrier-sense is impractical in existing CATV communication systems and is generally not employed. Although the state of the upstream channel can be inferred from the downstream channel by providing feedback information on the downstream channel, the settop terminals cannot accurately monitor the upstream channel due to the physical limitations of most existing CATV communication systems. In the tree and branch topology of a CATV system, an upstream transmission on one feeder cable cannot be received on the upstream channel of another feeder channel. Further, drop cable directional taps, the taps that connect the drop cables to the feeder cable, inhibit the detection of the transmission of another settop terminal even if it is on the same feeder.

Although CSMA/CD facilitates allocation of bandwidth on demand, it falls short of providing a guaranteed bandwidth to a settop terminal. Carrier sense exhibits unnecessary access delays as the number of active terminals reach a threshold beyond which throughput experiences intolerable delays. Therefore, it cannot efficiently support connection-orientated services and applications. Further, variable latencies may require communication traffic modelling for proper resource allocation in addition to imposing undesired limitations on settop terminal distance from the headend.

Accordingly, there exists a need for a simple medium access control method which efficiently utilizes the available upstream bandwidth and allocates the bandwidth required to support communications for requested applications and services with various traffic characteristics, such as latency, bandwidth and throughput requirements.

SUMMARY OF THE INVENTION

The hybrid medium access control system of the present invention is configurable to the type of communication required to support the desired application or service. The MAC system analyzes services requested from a settop terminal (or a network controller client) and determines the best MAC component for transmitting signals upstream based on the resources required by the service and the available network resources.

A portion of the upstream channel spectrum is allocated to each of the MAC components: 1) POP; 2) assigned static TDMA; 3) assigned dynamic multi-rate TDMA; and 4) random slot reservation-dynamic slot allocation TDMA. Depending upon the communication requirements of the service desired, the configurable MAC system will select the MAC component best suited to support the service. A frequency agile transmitter is then tuned to the channel which has been preallocated for the selected MAC component. As communication traffic varies over time, the system reallocates portions of the upstream channel spectrum among the different MAC components and may also reconfigure a specific MAC component.

The configurability feature of the hybrid MAC ensures that there are no restrictions on the type of applications or services that are transmitted over the CATV network, provided that the physical limitations, such as available return spectrum bandwidth, have not been reached. The network administrator is free to choose among any collection of such services and have the hybrid MAC dynamically configured by the network controller. One example of a dynamic configuration is when the frame size and time slot size within a cycle are both determined by the required latency and throughout per node to efficiently support a particular application. In this manner traffic loading assumptions need not be imposed.

This approach relieves the CATV network administrator from having to know the traffic pattern associated with the usage of such services, especially since many of these services have not et been established or fully characterized. Further, the hardware within the settop terminal need not be specified to always support the most demanding application. This simplifies the settop terminal, thereby providing a lower cost implementation of the system.

Various services have different bandwidth and latency requirements. The extent to which these services require support will inevitably vary depending on the success of that specific service. Success of a particular service depends on many factors, such as the demographics of a certain geographic area, socio-economic trends and service appeal in general. The configurable aspect of the hybrid MAC provides unique flexibility in both MAC implementation and utilization by the network administrator.

Accordingly, it is an object of the present invention to provide a hybrid MAC system which optimizes the resources of a CATV communication network depending upon the applications and services requested.

It is a further object of the invention to provide a hybrid MAC system that is configurable to the demands placed upon the communication network at any given time.

It is a further object of the invention to provide a hybrid MAC system which operates in the space, frequency and time domains.

Other objects and advantages of the system will become apparent to those skilled in the art after reading the detailed description of a presently preferred embodiment.

TABLE OF ACRONYMS

| | |
|---|---|
| AAL5 | ATM Adaption Layer 5 |
| AC | Addressable Controller |
| ASEM | Access Subnetwork Element Manager |
| ATM | Asynchronous Transfer Mode |
| APP | Adaptive Protocol Processor |
| CLP | Cell Loss Priority (ATM) |
| CRC | Cyclic Redundancy Code |
| DLL | Data Link Layer |
| DSA | Dynamic Slot Allocation |
| DTE | Data Terminal Equipment |
| ECM | Entitlement Control Messages |
| EIA | Electronics International Association |
| EMM | Entitlement Management Messages |
| FDM | Frequency Division Multiplexing |
| FTTN | Fiber To The Node |
| GFC | Generic Flow Control (ATM) |
| HEC | Head Error Check (ATM) |
| HFC | Hybrid Fiber Coax |
| IBTM | In-band Transport Multiplex |
| IP | Internet Protocol |
| IR | Infrared |
| IPPV | Impulse Pay Per View |
| ITEM | Integrated Transport Encryption Multiplexer |
| LAN | Local Area Network |
| LLC | Logical Link Control |
| L1G | Level One Gateway (regulated by the FCC) |
| L2G | Level Two Gateway (unregulated by the FCC) |
| MAC | Medium Access Control |
| MPEG2 | Motion Picture Expert Group 2 |
| MPTS | Multi-Program Transport Multiplex (MPEG2) |
| NVRAM | Non-Volatile Random Access Memory |
| PES | Packetized Elementary Stream |
| PSI | Program Specific Information |
| OAM&P | Operation Administration Maintenance And Provisioning |
| OBTM | Out-Of-Band Transport Multiplex |
| OSI | Open Systems Interconnection |
| OSS | Operation Support System |
| PAT | Program Association Table (MPEG2) |
| PCR | Program Clock Reference (MPEG2) |
| PCS | Personal Communication Services |
| PDU | Protocol Data Unit |
| PID | Packet Identifier |
| PMT | Program Map Table |
| POP | Plain Old Polling |
| POTS | Plain Old Telephony Service |
| PPV | Pay Per View |
| PSI | Program Specific Information |
| PSP | Protocol Syntax Processor |
| PT | Payload Type |
| QAM | Quadrature Amplitude Modulation |
| QPSK | Quadrature Phase Shift Keying |
| RSR | Random Slot Reservation |
| SDU | Service Data Unit |
| SPTM | Single Program Transport Multiplex (MPEG2) |
| STT | Settop Terminal |
| VCC | Virtual Channel Connection (ATM) |
| VCI | Virtual Channel Identifier (ATM) |
| VDT | Video Dial Tone |
| VIP | Video Information Provider (information owner) |
| VIU | Video Information User (subscriber) |
| VPI | Virtual Path Identifier (ATM) |
| WAN | Wide Area Network |

DETAILED DESCRIPTION OF THE PREFERRED EMBODIMENT

Figure 1:
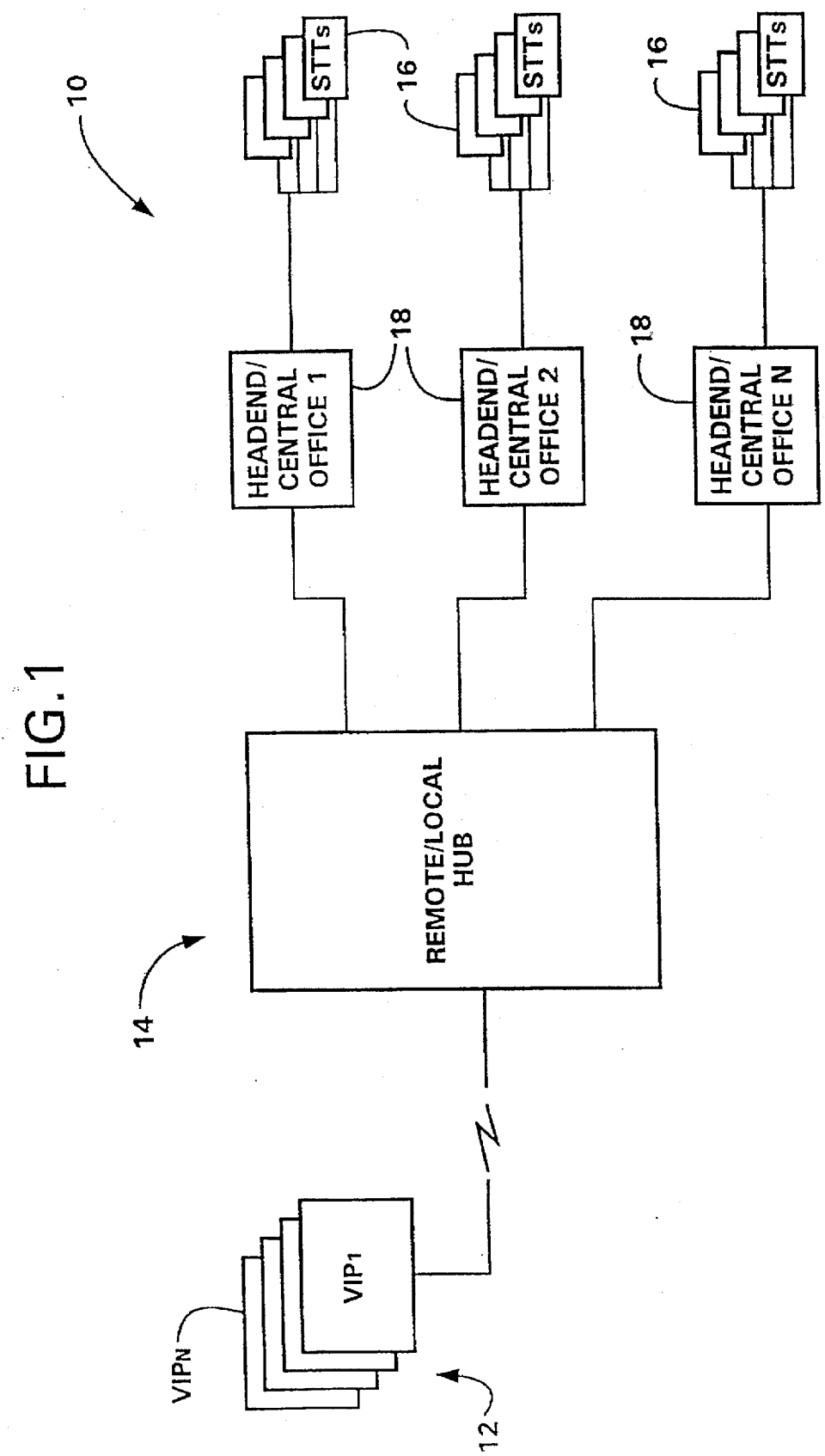
FIG. 1 is a block diagram of an end-to-end cable television communication network embodying the present invention.

A CATV communication network 10 embodying the present invention is shown in FIG. 1. The communication network 10 generally comprises a remote/local hub 14 which communicates with a plurality of headends/central offices 18, each of which in turn communicates with a plurality of settop terminals (STTs) 16. The STTs 16 are the interface between the television of a video information user (VIU) and the communication network 10. The remote/local hub 14 may be physically located remote from the headends 18 or, alternatively, may be located at the site of any one of the headends 18. The communication network 10 interfaces with a plurality of video information providers (VIPs) 12 which provide compressed digital video and services. Through the remote hub 14 and the headends 18, the communication network 10 provides two-way transparent (protocol stack independence, layer 3–7) data transport service between the VIPs 12 and the video information users at the STTs 16. The hub 14 provides broadcast information services from the VIPs 12 to all STTs 16 on the network 10. The headends 18 facilitate interactive communications between the VIPs 12 and the STTs 16 that are served by that particular headend 18. In the preferred embodiment of the invention, communications between the VIPs 12, the remote/local hub 14 and the headend/central offices 18 are transmitted over a fiber optic medium.

To provide the bi-directional communication flow over the network 10, the frequency spectrum of the physical medium from the headend 18 to the STTs 16 is divided into a downstream signal path originating at the headend 18 and an upstream signal path originating at the STTs 16. The bandwidth of the physical medium in the preferred embodiment extends up to 1 GHz. The downstream bandwidth typically employs frequencies above 50 MHz, and the upstream frequencies below 50 MHz. The downstream bandwidth is divided into 6 MHz QAM channels. The channels in the upstream bandwidth are 192 KHz QPSK channels. In the present invention, a portion of the channels are allocated for analog communications and the remainder for digital communications. Accordingly, analog and digital communications may be frequency division multiplexed (FDM) over the separate channels and transported over the same physical medium. Analog CATV communication systems are well known in the art, such as the system disclosed in U.S. Pat. No. 4,533,948, (to McNamara et al.) and in U.S. Pat. No. 4,245,245, (to Matsomoto et al.), which are incorporated by reference as if fully set forth.

Figure 2:
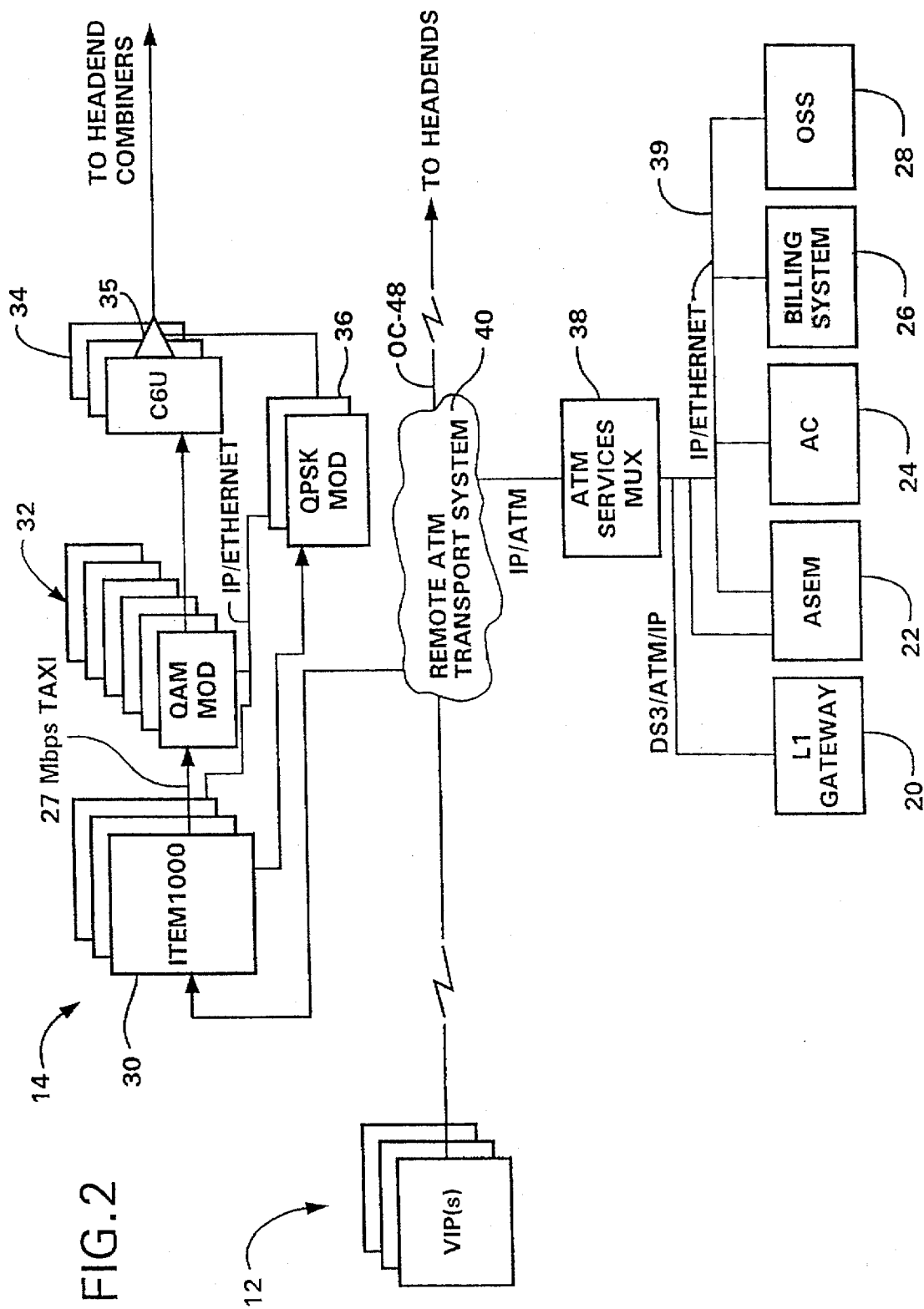
FIG. 2 is a block diagram of the remote/local hub of the present invention.

Referring to FIG. 2, a remote/local hub 14 made in accordance with the teachings of the present invention is shown. The hub 14 includes a level 1 gateway (L1G) 20, an access subnetwork element manager (ASEM) 22, an addressable controller (AC) 24, a billing system 26 (co-located or remotely located), an operations support system (OSS) 28 (co-located or remotely located), an integrated transport encryption multiplexer (ITEM) 30, a 64 quadrature amplitude modulation (QAM) modulator 32, an RF upconverter 34, a quadrature phase shift keying (QPSK) modulator 36 (optional) and an asynchronous transfer mode (ATM) services multiplexer 38. A backbone subnetwork 40 provides the physical medium and the optical to electrical interface for components within the hub 14 to communicate with each other and for outside entities (such as the VIPs 12 and STTs 16) to communicate with, and through, the hub 14. Communications between the hub 14 and the headend 18 elements are conducted via Internet protocol, asynchronous transfer mode (IP/ATM) signaling in WAN connectivity and IP/Ethernet in LAN connectivity. There may be more than one of each of these components depending upon system capacities (i.e. desired number of channels for the ITEM 30, number of subscribers for the AC 24 etc.).

The specific components which comprise the network architecture of the present invention will now be presented in detail. The video information provider (VIP) 12 consists of a level two gateway (L2G) and associated servers. The L2G acts as an interface between the VIP 12 and the network 10. The VIPs 12 are the source of live, archival broadcast or interactive service content, (comprising electronic encyclopedias, electronic catalogs, downloadable applications, movies, etc.), communications with the network 10, and service menus. The L2G communicates with the L1G 20 to manage the establishment and termination of service/session connections between the VIUs and the VIPs 12. The L2G also provides menu presentation and selection processing to and from the VIUs, performs VIU authentication and forwards billing information, for VIP 12 provided services to the billing system 26.

The level 1 gateway (L1G) 20 provides overall management of the network 10 in support of service delivery from a VIP 12 to the VIUs. The L1G 20 performs the following functions: 1) management of VIP-VIU interactive sessions through communication with the VIPs 12; 2) VIU authentication and collection of billing information relating to the network 10 support of VIP 12/L1G 20 provided services for forwarding to the billing system 26; 3) interactive menu presentation which is responsive to the service selected; and 4) database management of VIU profiles for digital broadcast and interactive services.

The access subnetwork element manager (ASEM) 22 acts as an agent to (i.e. is controlled by) the L1G 20 and/or OSS 28 (depending on the functions to be performed by the ASEM 22). At the direction of the L1G 20, the ASEM 22 provides management of headend 18 components (shown in FIG. 3), much in the same manner as the L1G 20 oversees management of resources on the backbone subnetwork 40 (via a designated backbone network manager not shown). The ASEM 22 determines which ITEM 50 and network controller 62 can accommodate a new connection (based on already utilized resources within each headend 18) and the L1G 20. The ASEM 22 conveys parameters such as ATM virtual path identifier (VPI) and virtual channel identifier (VCI) values for session signaling and session content to the ITEMs 30, 50 and the network controllers 62. The ASEM 22 also conveys associated transmission rates for the downstream ATM VPI/VCI and signaling rates for upstream as conveyed to it by the L1G 20 (these values are originated by the VIP 12/L2G). The ASEM 22 forwards appropriate scheduling parameters to the addressable controller 24 for encryption of pay-per-view (PPV) and impulse-pay-per-view (IPPV) services by the ITEMs 50. In the preferred embodiment of the invention, the ASEM 22 oversees OAM&P (Operation Administration Maintenance and Provisioning) functions through the backbone subnetwork 40 and interfaces with the OSS 28 to convey status or any OAM&P information of elements (Mux/Mods, Demod/Muxes, etc.) to the OSS 28.

The addressable controller 24 manages the secure delivery of broadcast, pay-per-view and non-video-on-demand (staggercast) services, including VIU authorization for those services and program scheduling by controlling the encryption subsystem. Access control and encryption parameters are forwarded to network elements which perform downstream and upstream encryption and decryption. In the preferred embodiment of the invention, downstream encryption is implemented in the ITEMs 30, 50 and downstream decryption is implemented in network modules 70, which are part of each STT 16. Upstream encryption is implemented in the network module 70 and upstream decryption is performed by a network controller 62. For interactive service communications, which are facilitated at the headends 18, the addressable controller 24 preprovisions the ITEMs 50 and the network modules 70 with the appropriate encryption/decryption parameters. For broadcast service communications, which are facilitated by the hub 14, the addressable controller 24 forwards similar parameters to the ITEMs 30 based on scheduling information forwarded by the L1G 20 through the ASEM 22.

The integrated transport encryption multiplexer (ITEM) 30 provides secure delivery of broadcast digital services information to the VIUs as an in-band transport multiplex (IBTM). The ITEM 30 originates the IBTM including video, audio and data by performing ATM to MPEG2 reassembly and re-adaption (AAL5) of single program transport multiplexes (SPTM). This includes ATM to MPEG2 reassembly of audio-visual content, ATM to AAL5-service data units (SDU), reassembly of non-MPEG2 data and removing jitter and adjusting program clock reference (PCR) timing for audio visual content. The ITEM 30 creates an aggregate MPEG2 multiplex from any input SPTM to any output multi-program transport multiplex (MPTM). In doing so, the ITEM 30 uniquely reassigns packet identifier (PID) values, creates an aggregate stream (program specific information (PSI) including a program association table (PAT) and a program (PMT) map table and selectively encrypts SPTMs as instructed by the ASEM 22. The ITEM 30 updates the aggregate stream PCR and inserts entitlement control messages (ECMs). It also performs similar operations when multiplexing L1G 20 signaling and addressable controller 24 messages (including entitlement management message (EMMs)) on the out-of-band transport multiplex (OBTM) which is then forwarded to the QPSK modulator 36.

The ITEM 30 provides a transport interface for digital broadcast communications between the VIPs 12 and the STT 16 via the backbone subnetwork 40 (or through direct interfaces if co-located). Broadcast audiovisual information and signaling originated by the VIPs 12 is forwarded to the STT 16 Via the ITEM 30. More specifically, the ITEM 30 accepts an ATM stream via an ATM/SONET interface (with sustained cell rate version of AAL5) and selects the appropriate cells for MPEG2 packet reassembly based on the value of the VCI which is conveyed by the ASEM 22 to the ITEM 30 during connection establishment. This is achievable since the virtual connection between the VIP 12 and the VIU is maintained end-to-end. The resulting MPEG2 transport multiplex (consisting of multiple audiovisual information streams, protocol-independent, from an ITEM 30 standpoint, information streams carried as AAL5-SDUs such as stock quotes) is output to the 64 QAM modulator 32.

In order to ensure secure delivery of a given broadcast audiovisual service, the ITEM 30 selectively encrypts, pursuant to the addressable controller 24 configuration, a given set of MPEG2 program streams within the MPEG2 transport stream. Access control and encryption related information is forwarded to ITEM 30 from the addressable controller 24. The ITEM 30 incorporates this information within the MPEG2 transport stream (per MPEG2 rules where applicable) and encrypts as instructed by the addressable controller 24. Each output of the ITEM 30 is forwarded to a single 64 QAM modulator 32 whose output is converted to the selected downstream channel by an RF upconverter 34 and then combined by an RF combiner 35 for downstream transmission. Each ITEM 30 keeps track of the resources required for a given service.

The QAM modulator 32 accepts the downstream IBTM output of ITEM 30, applies forward error correction and 64 QAM encoding. The output of the QAM modulator 32 is input to the RF upconverter 34.

Downstream OBTM signaling intended for all subscribers from the L1G 20 or the addressable controller 24, (and optional application downloads from the L1G 20, or L1G 20 menus to VIPs 12), are sent from the ITEM 30 to the QPSK modulator 36. The QPSK modulator 36 accepts the output of the ITEM 30. The QPSK modulator 36 also provides forward error correction and QPSK modulation for the OBTM transmission. The output is input to the RF combiner 35 for downstream transmission.

The RF upconverter 34 receives the outputs from the QAM modulator 32 for IBTM (and the QPSK modulator 36 for OBTM if upconversion was not performed by the QPSK modulator 36). Each RF upconverter 34 is capable of accepting the output from two modulators 32, 36. The RF upconverter 34 accepts two intermediate carrier frequencies (41.0–47.0) with an associated RF output which is frequency agile from 50 to 1000 MHz. The upconverter 34 will accept either the QAM modulator output 32 at IF from the ITEM 30 or an analog television channel input (not shown) at IF. The analog inputs will be upconverted to predetermined analog channels. The RF upconverter 34 is controlled either via front panel switches or remotely via the Ethernet interface. The output from the RF upconverter 34 is input to an RF combiner 35.

The RF combiner 35 is a full bandwidth 5 to 1000 MHz 12-way combiner/splitter. It may be used to merge signals from up to twelve channels or to distribute a single signal to twelve outputs. The RF combiner 35 employs directional coupler circuitry to attain high channel isolation for protection from channel to channel interference. The output from the combiner 35 bypasses the processing within the headend 18 and proceeds directly to the headend combiners (not shown) for further combination with the output from the headend 18.

The asynchronous transfer mode (ATM) services multiplexer 38 aggregates the non-null ATM cells from each DS3 interface (up to n DS3 interfaces, where n ranges between 1 and 18 per ATM services mux 38) and forwards the multiplexed cells to the backbone network 40. It also acts as an ATM edge device for the OAM&P in the headend 18 providing virtual LAN connectivity between the hub 14 and the headends 18. The backbone subnetwork 40 interconnects the LAN 39 where the ASEM 22 and the addressable controller 24 reside to the LAN 61 within the headend 18 to appear as though all components reside on the same LAN.

The operation support system 28 provides the OAM&P services in support of the network 10. The billing system 26 stores the billing information related to each VIU and generates billing statements. The general operation and functions of both of these components is well known to those skilled in the art.

Figure 3:
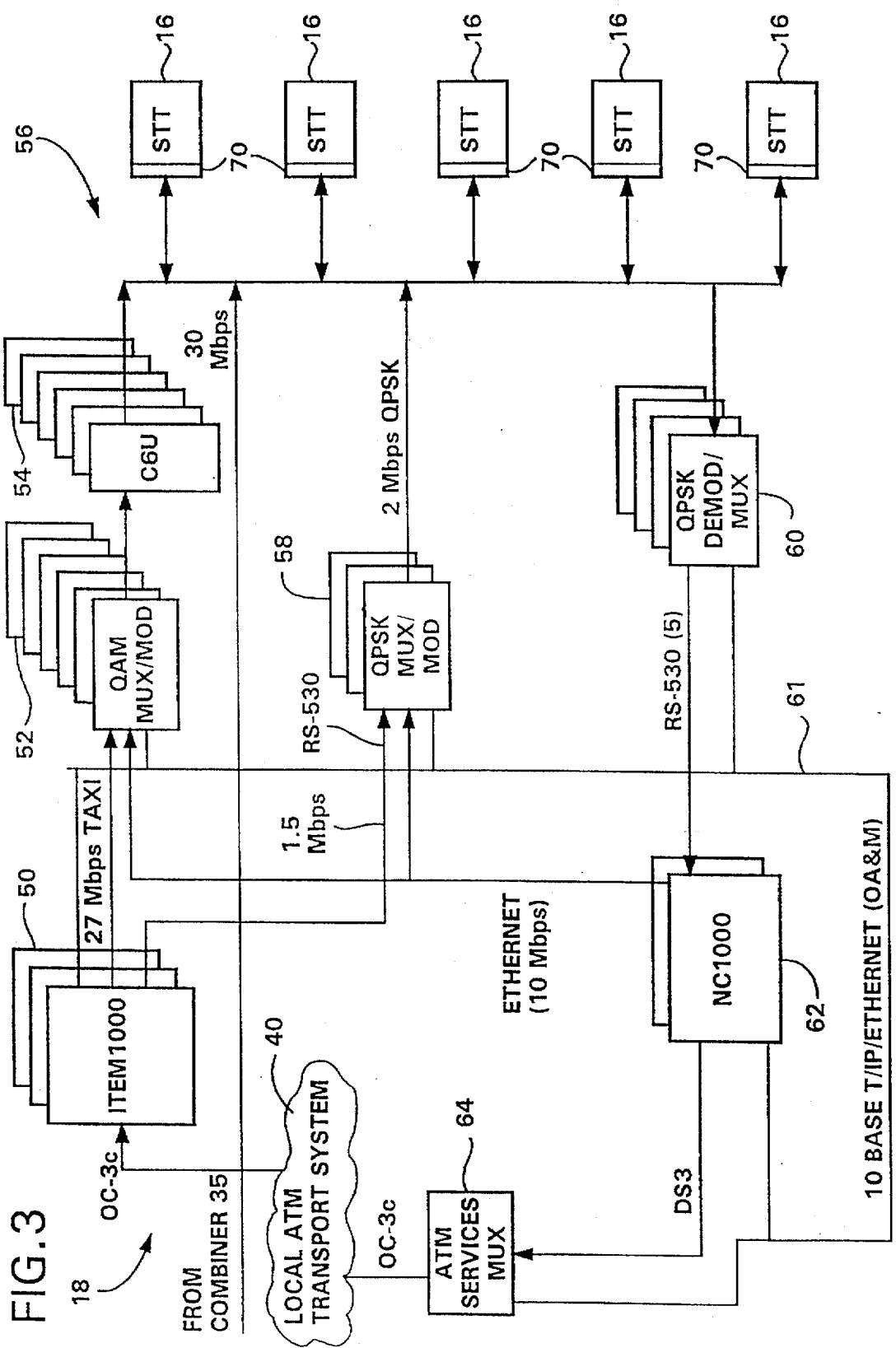
FIG. 3 is a block diagram of a headend/central office of the present invention.

Referring to FIG. 3, a headend 18 made in accordance with the teachings of the present invention is shown. The headend 18 facilitates digital interactive communications between the VIPs 12 an the VIUs. All of the digital broadcast communications which were processed by the hub 14 are further combined at the output of the headend 18 by combiners (not shown). Accordingly, no further processing of the broadcast communications by the headend 18 is required.

The headend 18 includes an ITEM 50, a 64 QAM multiplexer/modulator (mux/mod) 52, an RF upconverter 54, a QPSK multiplexer/modulator (mux/mod) 58, a QPSK demodulator/multiplexer (demod/mux) 60, a network controller 62 and a headend ATM services mux 64. The headend 18 communicates with a plurality of STTs 16 through the CATV transmission network 56. Each STT 16 includes a network module 70 for interfacing with the CATV transmission network 56.

The ITEM 50 provides secure delivery of interactive digital services information to the VIUs as an IBTM.

Additionally, it can be configured to provide broadest services to subscribers served by that particular headend 18. The ITEM 50 originates the IBTM including video, audio and data and VIP 12 signaling by performing ATM to MPEG2 reassembly and re-adaption (AAL5) of SPTMs. This includes ATM to MPEG2 reassembly of audio-visual content, ATM to AAL5-SDU's reassembly of session signaling or non-audio-visual session content, and removing jitter and adjusting PCR timing. The ITEM 50 creates an aggregate MPEG2 multiplex, (from the content and signaling of multiple sessions,) from any input SPTM to any output MPTM. As is performed by the ITEM 30 in the hub 14, the ITEM 50 uniquely reassigns PID values, creates an aggregate stream PSI and encrypts each SPTM. The ITEM 50 also updates the aggregate stream PCR and inserts ECMs. It also creates an aggregate multiplex of L1G 20 signaling and addressable controller 24 message, including EMMs, on the OBTM which is then forwarded to the QPSK mux/mod 58. Each ITEM 50 keeps track of the resources required for the active sessions. Should the ASEM 22 need to recover its database, it queries the different ITEMs 50 it oversees through the OAM&P interface (SNMPv2/UDP/Ethernet).

The single physical interface (OC-3c) into the ITEM 50 from the backbone subnetwork 40 allows for rate policing of both session content and signaling by the backbone subnetwork 40.

The QAM multiplexer modulator 52 accepts the downstream IBTM output of ITEM 50, adds signaling information in support of medium access control (MAC), inserts medium-access control synchronization information and applies forward error correction and 64 QAM encoding. The output of the QAM mux/mod 52 is input to the RF upconverter 54.

Downstream OBTM signaling from the L1G 20 or the addressable controller 24, (and optional application downloads from the L1G 20, or L1G 20 menus to VIPs 12), are sent from the ITEM 50 to the QPSK multiplexer modulator 58. The QPSK mux/mod 58 accepts the output of the ITEM 50 and multiplexes MAC information as in the in-band case. The QPSK mux/mod 58 also provides forward error correction and QPSK modulation for the OBTM transmission. The output is input to the RF combiner 59 (not shown) for downstream transmission.

The primary function of the network controller 62 is to administer medium access control (MAC) functions for the network module 70 interfacing to the network 10. MAC is a sublayer of the data link layer which coordinates the transmission of data from various network modules 70 to the headend 18 based on fair access and predictability of performance. The network controller 62 determines the MAC operating parameters based on those supplied by the ASEM 22 including but not exclusive to: 1) fiber to the node (FTTN) size; 2) upstream spectrum allocation (8–12 MHz, 8–15 MHz); 3) return path transmission rates; and 4) QPSK mux/mod 58 and QPSK demux/mod 60 configuration (i.e. connectivity to the network controller 62 which will allow the network controller 62 to route information such as acknowledgments to upstream transmitted packets), through the appropriate QPSK mux/mod 58 or QAM mux/mod 52.

The network controller 62 also administers the type of upstream access that will be required: 1) plain old polling (POP); 2) default assigned TDMA; and 3) dynamically assigned TDMA carriers (frequency and time slot assignments). The resources allocated by the network controller 62 for connection-oriented MAC service requests are based upon the desired session bandwidth passed by the ASEM 22 on behalf of the L1G 20 or the VIP 12. Medium access control acknowledgment messages and information are forwarded to the STTs 16 over Ethernet via the QAM mux/mod 52 and the QPSK mux/mod 58.

The network controller 62 supports upstream access for interactive services requested from STTs 16 by: 1) administering the adaptive MAC operation to maintain guaranteed minimal upstream latency and ensure fair upstream access by all subscribers; and 2) forwarding upstream data to the L1G 20, L2G, or addressable controller 24 via the ATM services mux 64. The network controller 62 also allows for the dynamic provisioning of multiple effective transmission rates according to the needs of the applications and services utilizing the network 10.

The network controller 62 alleviates the L1G 20 from any functions pertaining to upstream access by overseeing network module 70 initialization (default carrier, default time division multiple access (TDMA) transmission time slots, etc.) as well as overseeing dynamic TDMA carrier and time slot assignment whenever a VIP-VIU session is established.

In the preferred embodiment, the network controller 62 is configured to accommodate n×(1.5 Mbps) streams from a QPSK demod/mux 60 (1<n<5) and forwards the upstream ATM cells to an appropriate external routing/switching element.

The network module 70 interfaces the STT 16 to the hybrid fiber coaxial (HFC) physical medium 56. The network module 70 facilitates the extraction of RF signals and demodulating (64 QAM or QPSK) these signals. Forward error correction is then performed before any data link layer (DLL) processing takes place. As part of the DLL processing, the network module 70 may decrypt certain IBTM or OBTM components and perform AAL5-SDU based (upper layer) signaling extraction. It forwards AAL5-SDU protocol data units (PDU) to the STT central processing unit as well as the service stream to the other STT processing elements.

The network module 70, under the management of the network controller 62, forwards signaling from the STT 16 to the corresponding network controller 62 which forwards this information to the L1G 20 or to the VIP 12 through the backbone subnetwork 40. The network module 70 also communicates with the addressable controller 24 for access control and decryption/encryption authorization.

The QPSK demod/mux 60 receives up to six upstream carriers, demodulates the carriers and performs forward error correction. The resulting ATM cell streams are multiplexed to form a nominal 1.5 Mbps stream which is forwarded to the network controller 62. Additionally, the QPSK demod/mux 60 forwards measured values of certain physical layer parameters to the network controller 62 for network module 70 power calibration, and performs upstream synchronization supporting functions to facilitate ranging of STTs 16 (propagation delay calibration) for optimal TDMA operation.

The components shown in FIG. 3 which have not been accompanied herein by a specific description operate as the equivalent components shown in FIG. 2.

Although the aforementioned description of the specific components provides an understanding of the function of each component, a thorough understanding of the network architecture of the present invention will be further facilitated by a description of the signaling and communications between network components.

The information from a VIP 12 to a STT 16 flows on an IBTM which is modulated as a 64 QAM signal, while information from the L1G 20 to a STT 16 flows through either an IBTM or an OBTM, modulated as a QPSK signal. A downstream path consists of both an IBTM and an OBTM destined to a STT 16. An upstream signaling path consists of STT 6 to L1G 20, VIP 12, addressable controller 24, or network controller 62 signaling, via the network module 70, through the network controller 62, and through the backbone subnetwork 40. In addition, an upstream path consists of signaling between the network module 70 and the network controller 62. All upstream signals are QPSK modulated.

With respect to the downstream path IBTM, the CATV communication network 10 uses the backbone subnetwork 40 to interconnect the VIP 12 to the ITEMs 30, 50. Digital streams containing compressed video material embedded in ATM cells originate at the VIP 12. AAL5 adaptation is used to transport a MPEG2 SPTM over ATM. Additionally, signaling originating from the VIP 12 to the STT 16 is carried as IP/ATM (or any protocol/ATM) using AAL5 adaptation as well. The items 30, 50 accept a plurality of the ATM streams, as instructed by the ASEM 22, to create an aggregate MPTM whose aggregate nominal rate is 27 Mbps. The VIP 12 informs the L1G 20 of the service and signaling rates required in support of a given SPTM. The L1G 20 in turn forwards this information to the ASEM 22. The ASEM 22 determines which of the ITEMs 30, 50 present within a given headend 18 can accommodate this SPTM. The ASEM 22 then conveys this parameter along with other parameters such as MPEG2 program number to be assigned to the SPTM, ITEM 30, 50 output port (1 of 6). This mapping from ATM VCI to MPEG2 program number allows the reservation of the virtual channel (connection) end-to-end through the ITEM 30, 50 (and terminated at the STT 16) whenever a new SPTM has to be multiplexed for delivery to a single SST 16 or multiple STTs 16, (single STT 16 in the case of an interactive service and multiple STTs 16 in the case of a broadcast service). The output of the ITEM 30, 50 consisting of a MPTM is then forwarded o the 64 QAM mux/mod 32, 52 and then to the RF upconverter 34, 54 to place the 64 QAM signal in the appropriate 6 MHz channel.

With respect to the downstream path OBTM, the output of the L1G 20 signaling is delivered to the ITEM 30, 50 through the same OC-3c interface as the IBTM. Each ITEM 30, 50 has the capability of generating an OBTM, carrying L1G 20 signaling for L1G-VIU default connections as well as EMMs originating from the addressable controller 24. The OBTM output of the ITEM 30, 50 is forwarded to a QPSK mux/mod 36, 58.

With respect to the upstream path, the STT 16 central processing unit forwards signaling to the network module 70 which segments the data into individual ATM cells (AAL5) and forwards the cell based PDUs to the STT's 16 QPSK modulator (not shown). Any non-VIP-VIU session signaling is set over a default upstream carrier (such as that destined to the L1G 20 or network controller 62). All session-related signaling is forwarded on a dynamically assigned carrier which is assigned by the network controller 62 during session connection establishment. The VIP 12 specifies the effective session upstream signaling rate and the downstream session signaling and content rate, depending on the activated application, to the L1G 20. The L1G 20 in turn forwards these parameters to the ASEM 22. The downstream rates are forwarded to the ITEM 30, 50 while the upstream signaling rate is provided to the network controller 62. A default upstream signaling rate is assumed by the network controller 62 if the VIP 12 leaves this parameter unspecified. The ASEM 22 also forwards the upstream VPI/VCI pair to the network controller 62 on a VIU-VIP session by session basis, which in turn informs the network module 70 during connection establishment phase. The network module 70, as part of the initialization process, is aware of the default upstream carrier and the VPI/VCI values primarily used for STT 16-L1G 20 signaling.

Each upstream carrier is demodulated by a QPSK demod/mux 60 which, in addition to demodulating a given number of carriers, multiplexes the individual upstream PDUs (preserving PDU boundary) and forwards the multiplex to the network controller 62. The network controller 62 examines each PDU and processes it by either forwarding it to the ATM services mux 64 (which performs an ATM relay function to the L1G 20 or the VIPs 12) or forwarding it to the appropriate processing element within the network controller 62 when the PDUs are MAC specific.

Figure 4:
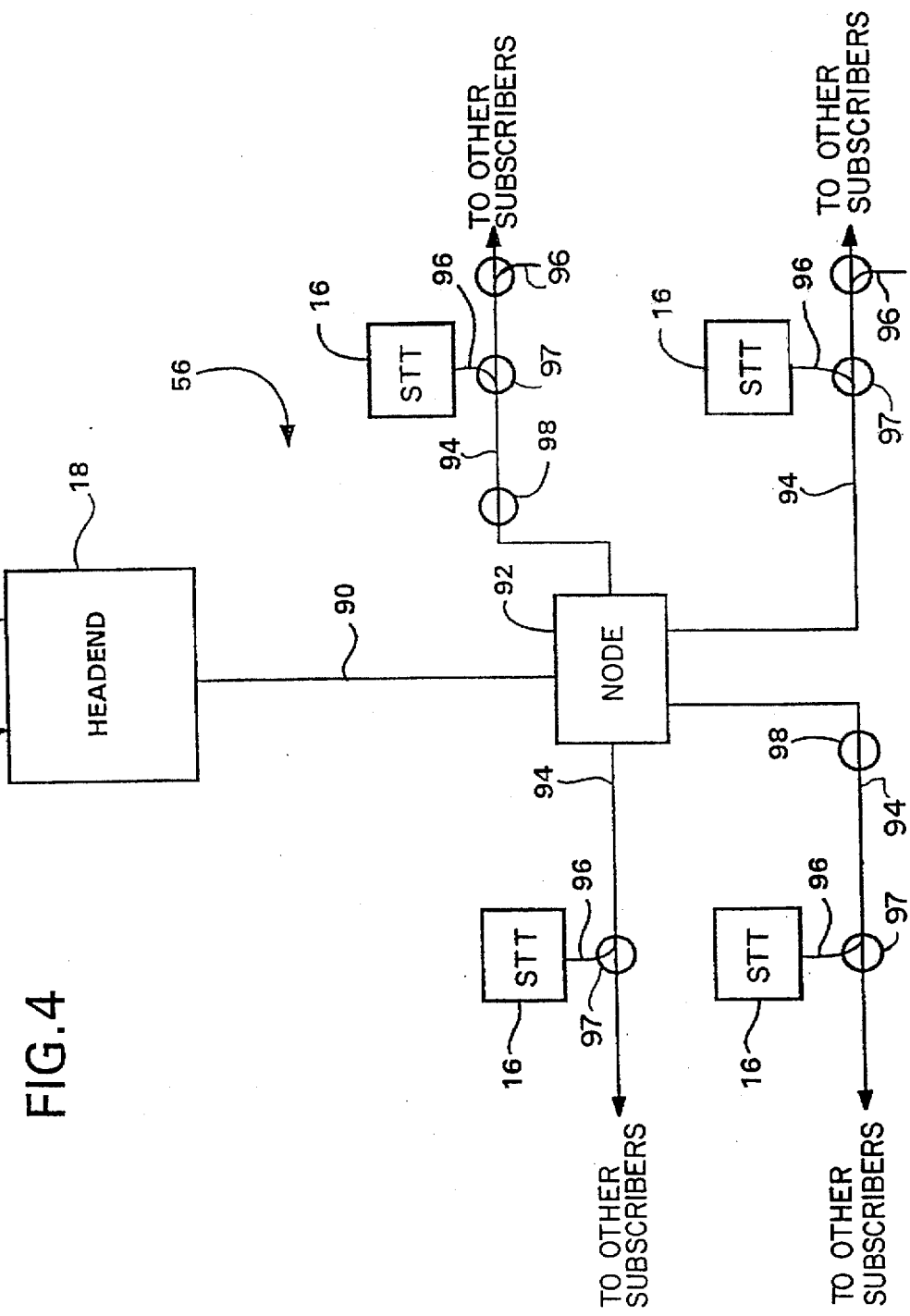
FIG. 4 is a block diagram of the cable television distribution network of the present invention.

Referring to FIG. 4, the topology of the signal transmission network 56 between the headend 18 and the STTs 16 is preferably a hybrid star followed by a tree and branch topology. In the predominantly star-type aspect of the hybrid fiber-coax network, a fiber-optic line 90 is provided from the headend 18 to each node 92. Each node 92 includes forward and return signal amplifiers and splitters/combiners to support the bi-directional communications. The single optical input 90 is converted into an electrical signal which is split into four coaxial feeder lines 94 which are generally dedicated to a limited group of STTs 16 such as neighborhood. In the predominantly tree and branch aspect of the hybrid network, the-feeder lines 94 connect the node 92 to the coaxial drop lines 96 of individual STTs 16. At points where the cable divides, signal splitters/combiners are installed. Signal amplifiers 98 may also be provided along the coaxial feeder lines 94 as required to boost the RF signals and ensure that nominal signal strength levels are maintained.

Table 1 provides the I/O interfaces of the pertinent components in the preferred embodiment.

TABLE 1

| COMPONENT | INTERFACES |
|---|---|
| Addressable Controller | I/O: |
|  | 2/10BaseT Ethernet |
|  | 32 × RS-232 (4 × multipin-connector driving 8 port concentrator) |
| Network Controller (NC 1000) | Input: |
|  | 5 × EIA/RS-485 DTE I/F |
|  | Outputs: |
|  | 1 × ATM/DS3 (information rate <=9 Mbps) |
|  | I/O: |
| RF Modules Data Interfaces | 2 × Ethernet 10BaseT |
|  | 64QAM MUX/MOD |
|  | Input: |
|  | 1 × TAXI @ 27 Mbps |
|  | Output: |
|  | 1 × IF @ 43.75 MHz (75 Ohm F-Connector) |
|  | I/O: |
|  | 2 × Ethernet 10BaseT |
|  | QPSK MUX/MOD: |
|  | Input: |
|  | 1 × EIA/RS-530 @ 1.5 Mbps |

TABLE 1-continued

| COMPONENT | INTERFACES |
|---|---|
|  | Output: |
|  | 1 × RF, Range: 71–129 MHz (75 Ohm F-Connector) |
|  | I/O: |
|  | 2 × Ethernet 10Base T |
|  | QPSK DEMOD/MUX: |
|  | Input: |
|  | Up to 6 RF Inputs |
|  | Output: |
|  | 1 × EIA/RS-485 @ 1.5 Mbps |
|  | I/O: |
|  | 2 × Ethernet 10Base T |
| Integrated Transport | Input: |
| Encryption Mux (ITEM 1000) Data Interfaces | 1 × Optical Carrier 3-Concatenated (OC-3c, 155.52 Mbps) |
|  | Outputs: |
|  | 5 × TAXI @ 27 Mbps |
|  | 1 × RS-530 @ 1.544 Mbps |
|  | I/O: |
|  | 1 × Ethernet 10Base T |
|  | 1 × RS-232 @ 19.2 Kbps |
| Network Module Interfaces | Input: |
|  | RF via F Connector |
|  | Output: |
|  | RF Bypass via F Connector |
|  | Video via RCA phono plug |
|  | Audio Right and Left Channels via RCA phono plug |
|  | I/O: |
|  | Digital bidirectional interface, (32-pin molex connector) |

Figure 5:
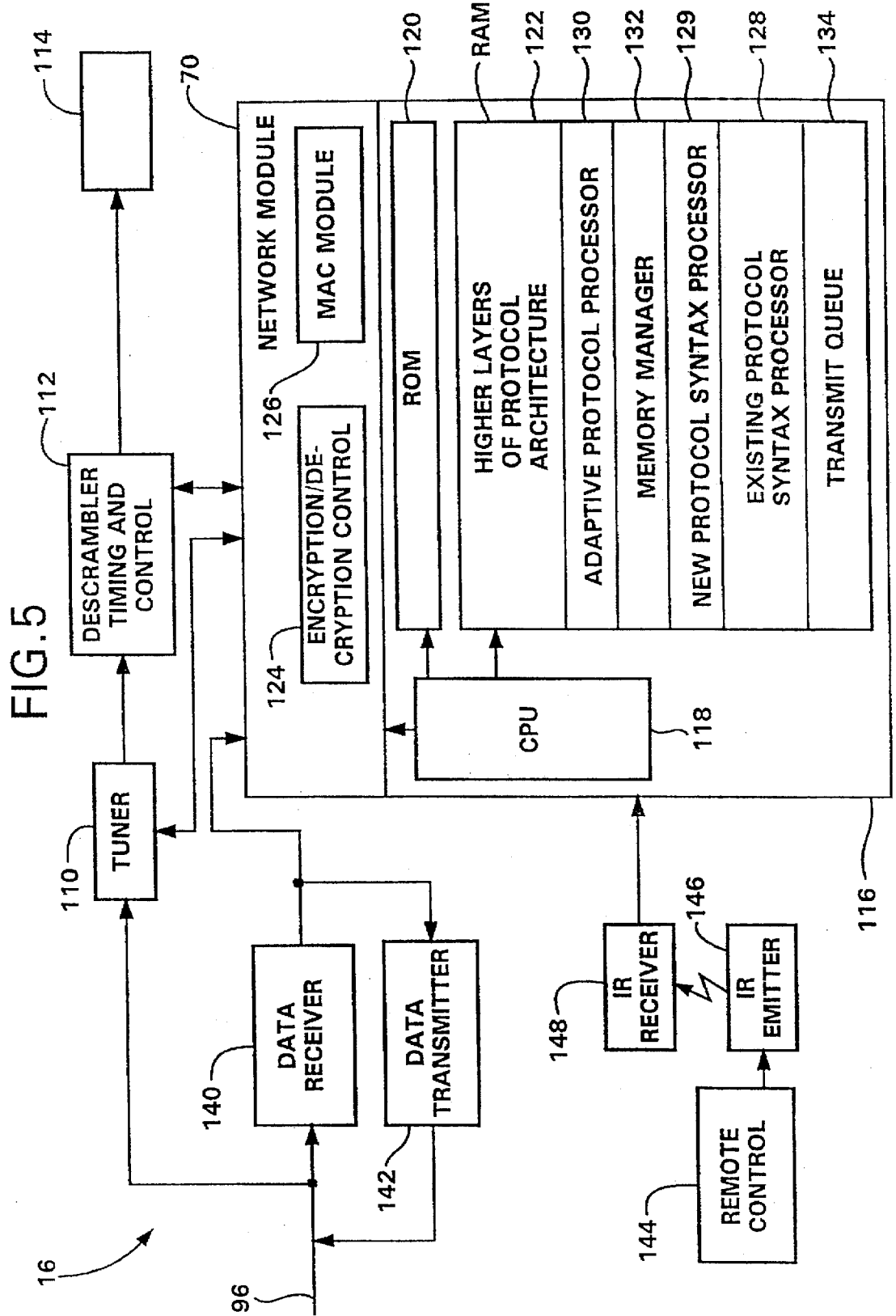
FIG. 5 is a block diagram of a settop terminal of the present invention.

Referring to FIG. 5, a block diagram of a SST 16 is shown. Communications in the downstream path originating at the headend 18 are transmitted through the coaxial drop line 96. Video information signals are processed through a frequency agile tuner 110 and a descrambler timing and control module (optional—if analog video is scrambled) 112 before entering a television set 114. The tuner 110 is responsive to the frequency of the downstream channel selected by the VIU to remove the carrier signal. The descrambler 112 descrambles the baseband signal of the selected channel if the VIU is an authorized user. Similarly, digital video passes through the encryption/decryption controller 124 which then MPEG2 decodes and D/A converts the signal and forwards the composite video for display. (The baseband video signal is placed on a second carrier signal frequency, typically television channel 3 or 4, for input into the television 114). The tuner 110 and descrambler 112 are controlled by the network module 70, which includes an encryption/decryption controller 124 and a MAC module 126.

The network module 70 interfaces with a processor 116 which comprises a central processing unit (CPU) 118, a read only memory (ROM) 120 and a non-volatile random access memory (RAM) 122. Several processing components reside in the RAM 122, including an existing protocol syntax processor 128 (PSP), an adaptive protocol processor 130

(APP), a memory manager 132 and a transmit queue 134. The remaining portion of the RAM 122 is available for processing higher layers of the protocol and for general use. The APP 130, which includes a primitive PSP, is also resident in ROM 120 for initial start-up and recovery operation. The CPU 118, in conjunction with the different processing components in RAM 122, allows the STT 16 to read incoming data frames, parse the frames by sequentially stripping off each nested layer, and perform the application embedded therein.

Data frames within the OBTM forwarded through the headend 18 to the STT 16 are received through a second frequency agile receiver 140, which is tuned to the particular control channel for receiving control messages. In the preferred embodiment, the transmitter 142 transmits communications upstream from the STT 16 to the network controller 62.

The STT 16 is controlled via the subscriber remote control 144. The remote control 144 has an infrared (IR) signal emitter 146 which sends IR control signals to the IR receiver 148 as is well known in the art. The received control signals are then forwarded to the processor 116.

The preferred embodiment of the present invention employs a hybrid medium access control (MAC) system 400 to control access to the upstream bandwidth by the plurality of STTs 16. The hybrid MAC system 400 comprises different MAC components which are selected based upon the type of communication that is associated with the corresponding application or service selected by the VIU. Each MAC component resides on a separate frequency. MAC parameters are configurable to provide additional flexibility and operational and resource optimization (such as latency, probability of blocking and bandwidth utilization).

Applications and services selected by the VIU can be categorized according to the communications required to support the application or service. The first category of applications and services are associated with asynchronous, latency independent communications. These communications are the least demanding from a performance standpoint since the applications and services are capable of functioning effectively with response time latencies of minutes or hours. This is typical of transactions that do not require a subsequent action to be performed by the application or the network 10 in support of a VIU visible response to an original action. For these applications and services, the time that it takes to deliver the data to the associated destination is not a critical factor.

The second category of applications and services are associated with asynchronous, contention-prone communications. These communications place medium demands on performance and thus, maximum response latencies on the order of sub-seconds are required. This category includes transactions and services that are followed by a subsequent action at the application, the L1G 20, or the VIP 12 in support of a VIU visible response to an original action. Timely delivery of information on the order of microseconds is critical for applications such as information on demand and video-on-demand applications.

The third category of applications are associated with isochronous communications. These are the most demanding in terms of bandwidth, guaranteed maximum latencies (milliseconds), and a symmetric utilization of upstream and downstream bandwidths. Advanced multi-media applications, plain old telephony service (POTS), personal communication services (PCS), and video telephony are some of the applications in this category. By allocating a separate portion of the bandwidth for different types of communications, the hybrid MAC system 400 of the present invention will support future services that are not yet envisioned.

Figure 7:
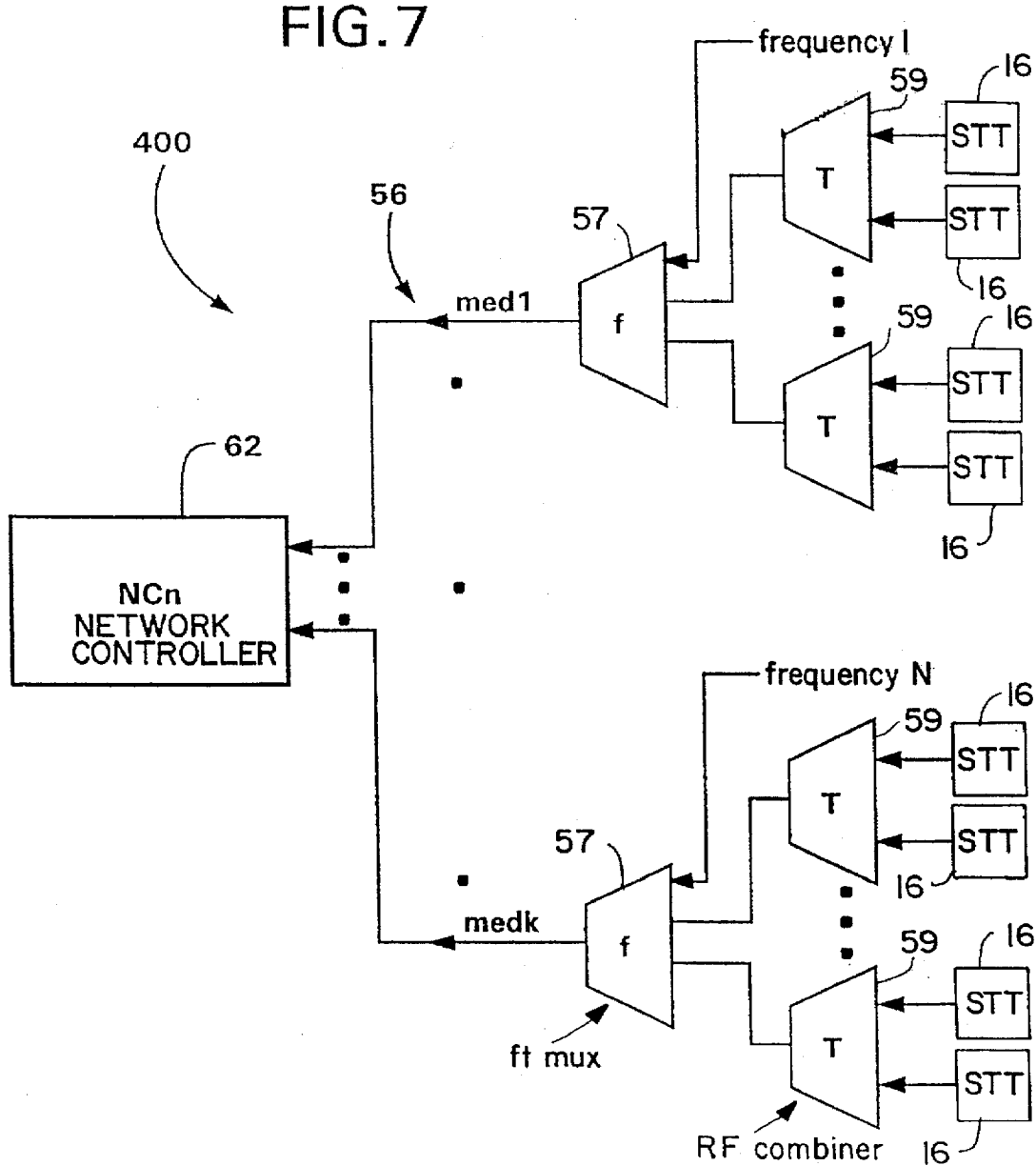
FIG. 7 is a block diagram of the space, frequency and time domains of the hybrid MAC system.

Referring to FIG. 7, the configurable hybrid MAC system 400 employs space division multiplexing, frequency division multiplexing, and time division multiplexing to efficiently utilize the upstream bandwidth. The space domain allows for dividing the subscriber population into smaller segments based on a number of factors such as physical location, subscriber population density and projected growth. Each network controller 62 may be assigned a number of physical signal transmission paths, such as a fiber 90 and associated carriers. This allows for gradual network expansion from the physical topology standpoint since additional network controllers 62 may be added to the headend 18 based upon the performance needs of the network which are a function of fiber to the node (FTTN) size, service take rate, or simultaneous usage of a given service, etc.

The frequency domain facilitates the efficient support of the hybrid MAC components as well as further segmentation of the STT 16 population. Each of the hybrid MAC components are allocated a portion of the upstream bandwidth having at least one RF carrier frequency. This is a primary factor behind the simplicity of the design that could not be achieved by prior art MAC methods that attempted to support asynchronous, an isochronous and isochronous data without distinct channel separation.

The time domain is used to allow multiple access at the smallest granularity as compared to the other two domains. The time domain is the basis for the fixed and both types of dynamic TDMA MAC components, (dynamic multi-rate TDMA and random slot reservation-dynamic slot assignment (RSR-DSA) TDMA). Multiple access within the same STT 16 population segment and the same allocated upstream frequency is achieved in this domain.

The hybrid MAC system 400 is adjustable to the variety of current and future applications that may be added from a network resource support standpoint by categorizing each application (as aforementioned) according to the network resources required to support the following types of communication: 1) isochronous communications; and 2) asynchronous communications including, latency independent and contention-prone communications.

In operation, the network controller 62 receives a plurality of service requests over preassigned default connections from the plurality of STTs 16. These requests are forwarded to the network controller 62 through the QPSK demod/mux 60. Once allocation of resources (frequency and time domain) are selected by the network controller 62, confirmation is sent downstream to the MAC module 126 via OBTM through an appropriate QPSK mux/mod 58. The process is repeated by other STTs 16 as application and service session requests are made.

Referring again to FIG. 5, the preferred STT 16 for implementing the hybrid MAC system 400 is shown. The STT 16 includes a medium access control module 126 and a decryption/encryption control module 124 for communicating with the network controller 62 through the transmission network 56. The STT 16 initiates a service request when the VIU selects a particular application, service, or session. The MAC module 126 analyzes, based on well known application service types, the communication requirements (i.e. isochronous, asynchronous) of the requested service or session type, and selects the MAC component which will most closely meet the communication requirements. Since each MAC component has a preassigned upstream bandwidth, the frequency agile data transmitter 142, at the direction of the MAC module 126, is tuned to a frequency allocated to the particular MAC component. The STT 16 thereafter communicates over that frequency until the connection is released (communication terminates) and/or the network controller 62 reassigns or reallocates resources.

Alternatively, a network controller client, such as ASEM 22, may request (on behalf the L1G) the allocation of resources in support of a session of a given service. Once the network controller 62, allocates the appropriate MAC resources, it informs the STT 16 of the relevant MAC parameters associated with the connection established in support of the requested session.

Figure 6:
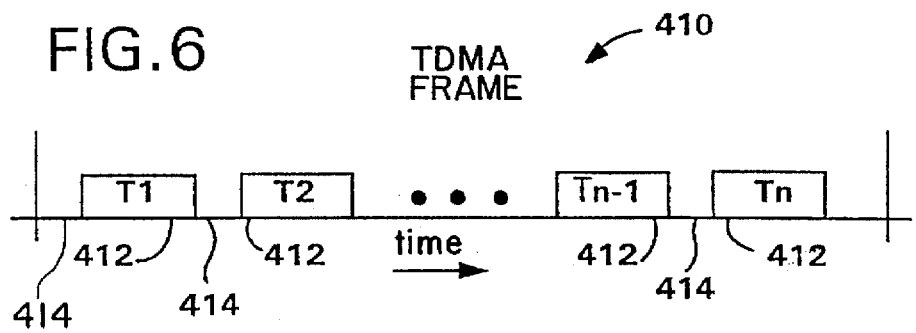
FIG. 6 is a time division multiple access frame utilized in the preferred embodiment of the hybrid MAC system.

Referring to FIG. 6, a TDMA frame 410 as used by the assigned dynamic multi-rate TDMA MAC component is shown. The frame 410 comprises a series of time slots 412 which may be separated in time 414. The configurable parameters for the assigned dynamic multi-rate MAC component are the frame size, the time slot size and the spacing 414 between time slots 412. The size of the frame 410 may be varied by increasing or decreasing the number of time slots 412. This affects the latency and the effective transmission rate of the communication. The size of the time slot 412 may also be varied to change the number of clock cycles within a time slot, and therefore the number of packets, that may be transmitted in a given time slot 412 (again, changing the effective transmission rate). The spacing 414 between time slots 412 may be varied to change the number of packets which may be transmitted within a given frame 410. The adjustment of the spacing 414 between time slots 412 is also used for propagation delays to compensate for the different physical distances of the STTs 16 from the network controller 62.

The static TDMA MAC component is typically assigned by the network controller 62 based on a connection request from a network controller client such as the ASEM 22. For the static TDMA MAC component, the TDMA frame is fixed at one time slot per STT 16. This provides guaranteed bandwidth for access by STTs 16 within a given frame time conveying additional connection requests or conveying diagnostic/status information which may also be forwarded on the POP carrier).

Figure 8A:
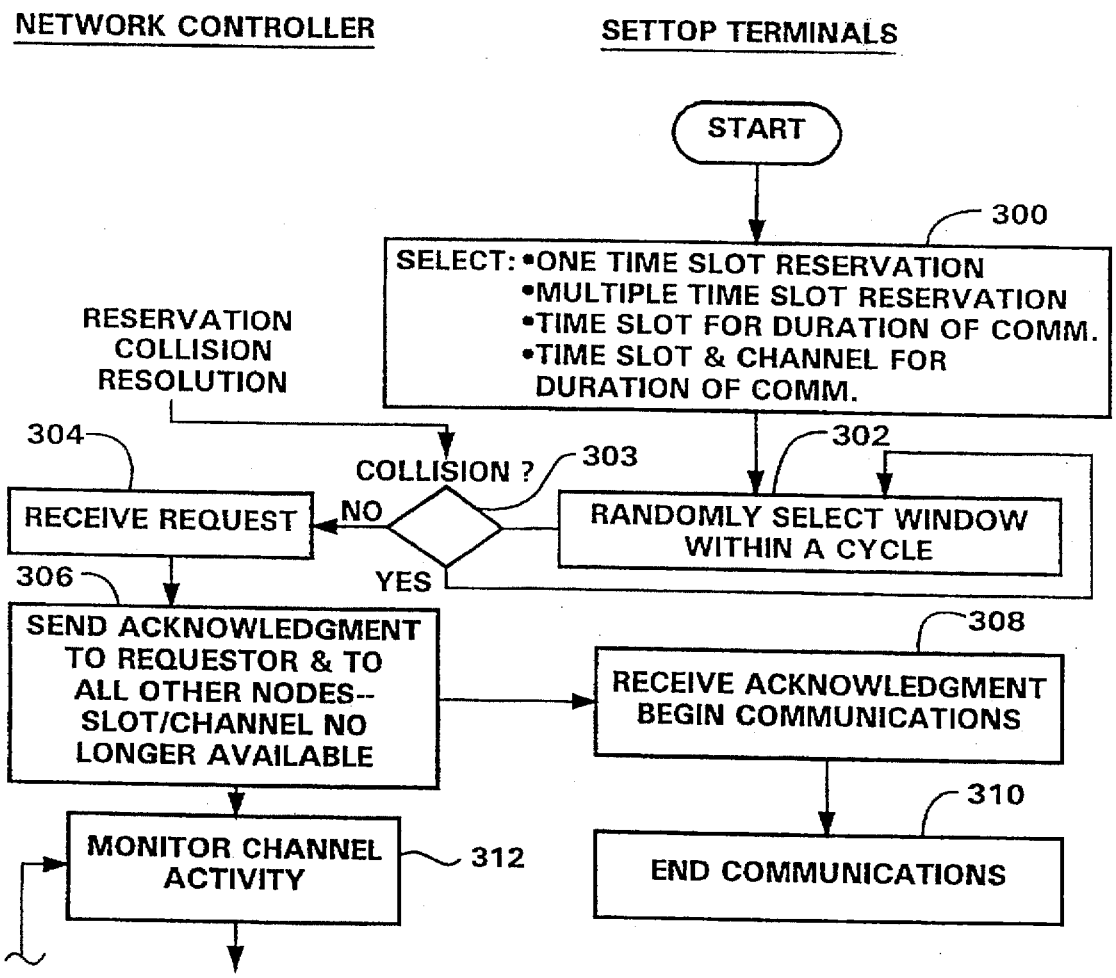
FIG. 8 is a flow diagram of the random slot reservation/dynamic slot allocation time division multiple access component of the hybrid MAC system.
Figure 8B:
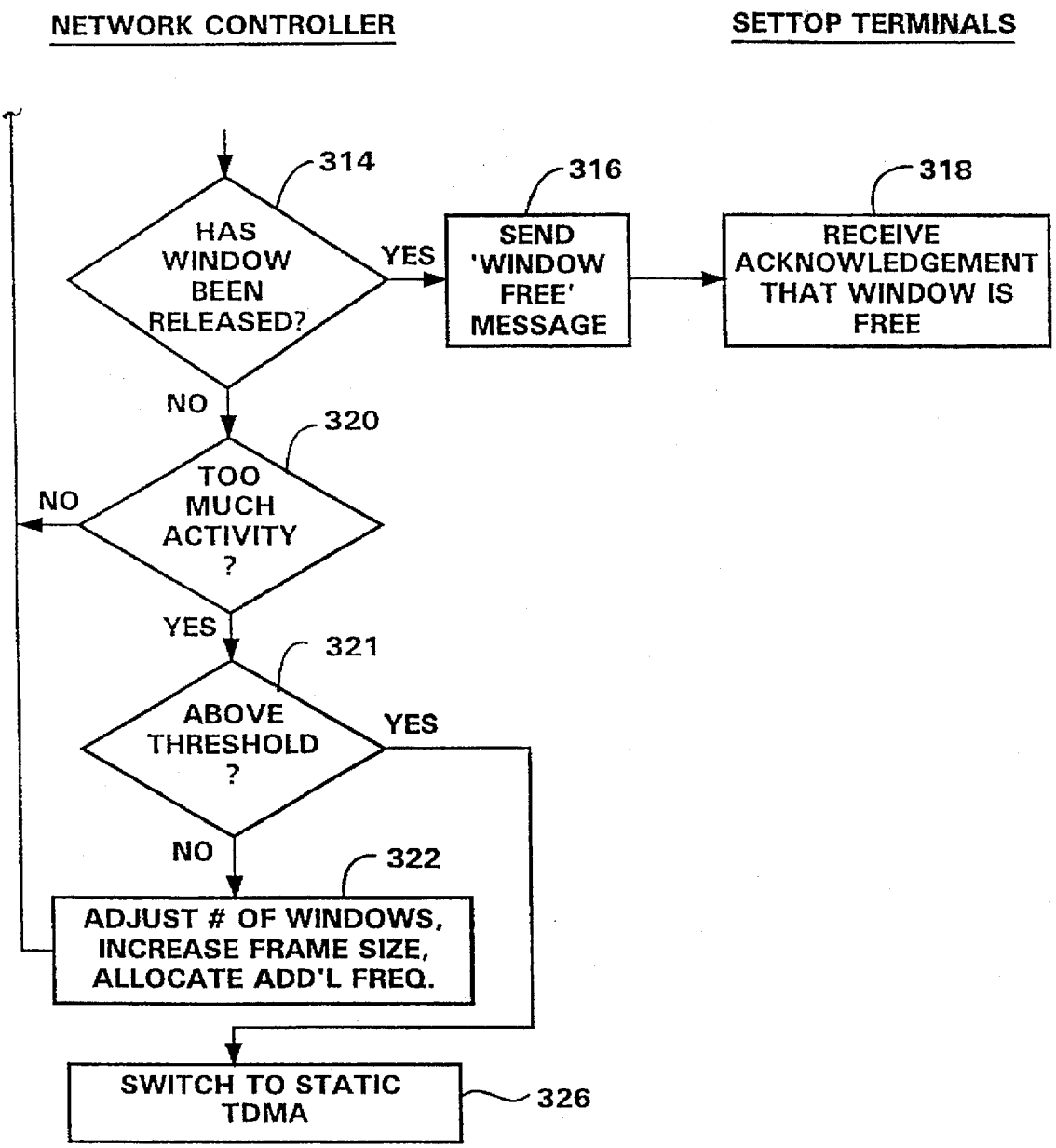

In the preferred embodiment, the RSR-DSA MAC component is the default TDMA channel for large nodes with high take rates in place of the static TDMA. If the MAC module 126 has determined that the requested service is suited for random slot reservation-dynamic slot allocation (RSR-DSA), the STT 16 initiates upstream communications by randomly selecting a time slot 412 within a given frame 410 or by transmitting on a previously reserved time slot 412. The probability of collisions is inversely proportional to the number of time slots 412 per frame 410 and directly proportional to the number of STTs 16 that need to communicate during that cycle. The network controller 62 assigns the RSR-DSA TDMA frames 410 in accordance with the procedure shown in FIG. 8 In step 300 the STT 16 may reserve a time slot 412 once, or may request reserving the time slot 412 over multiple cycles. This reservation request is transmitted upstream over a randomly selected time slot 412 (step 302). If a collision is detected by the network controller 62, the network controller 62 transmits a message to the STTs 16 to retransmit the request (step 303). If no collision is detected by the network controller 62, the network controller 62 receives the request (step 304) and sends an acknowledgment to the requesting STT 16 and to all other STTs 16 that the particular slot within that channel is no longer available (step 306). The STT 16 receives this acknowledgment (step 308) and the requesting STT 16 begins communications. The network controller 62 dynamically assigns the requested time slot 412 by acknowledging a reservation by a message sent to the STT 16 in the downstream OBTM. After the STT 16 has terminated communications (step 310), the time slot 412 is released. The network controller 62 monitors the channel activity (step 312), and when it determines (step 314) that the time slot 412 has been released, a "time slot free" message is sent to all STTs 16 (step 316.) All STTs 16 receive an acknowledgment that the time slot 412 is available (step 318). If, while monitoring channel activity (step 412), the network controller 62 determines that there is too much activity over a particular channel (step 320), the network controller 62 adjusts the number of time slots 412, and increases the size of the frame 410, or allocates additional frequencies (step 322). Transmission efficiency may also be increased by performing ranging which accounts for propagation delays. This adjusts the spacing 414 between time slots 412 thereby allowing for additional time slots 412. If the increased frame size is greater than the corresponding fixed TDMA frame size, (step 324) the network controller 62 determines that particular channel is to be designated a static TDMA channel (step 326).

While the RSR-DSA describes the connectionless mode of operation intended for the default TDMA channel in a large node size and high take-rate, the connection-oriented mode is similar in the sense that a time slot 412 or set of time slots 412 may be reserved over multiple cycles (frames) for the duration of the connection. Additional information may be conveyed by the network controller 62 during connection establishment and connection release phases.

Figure 9:
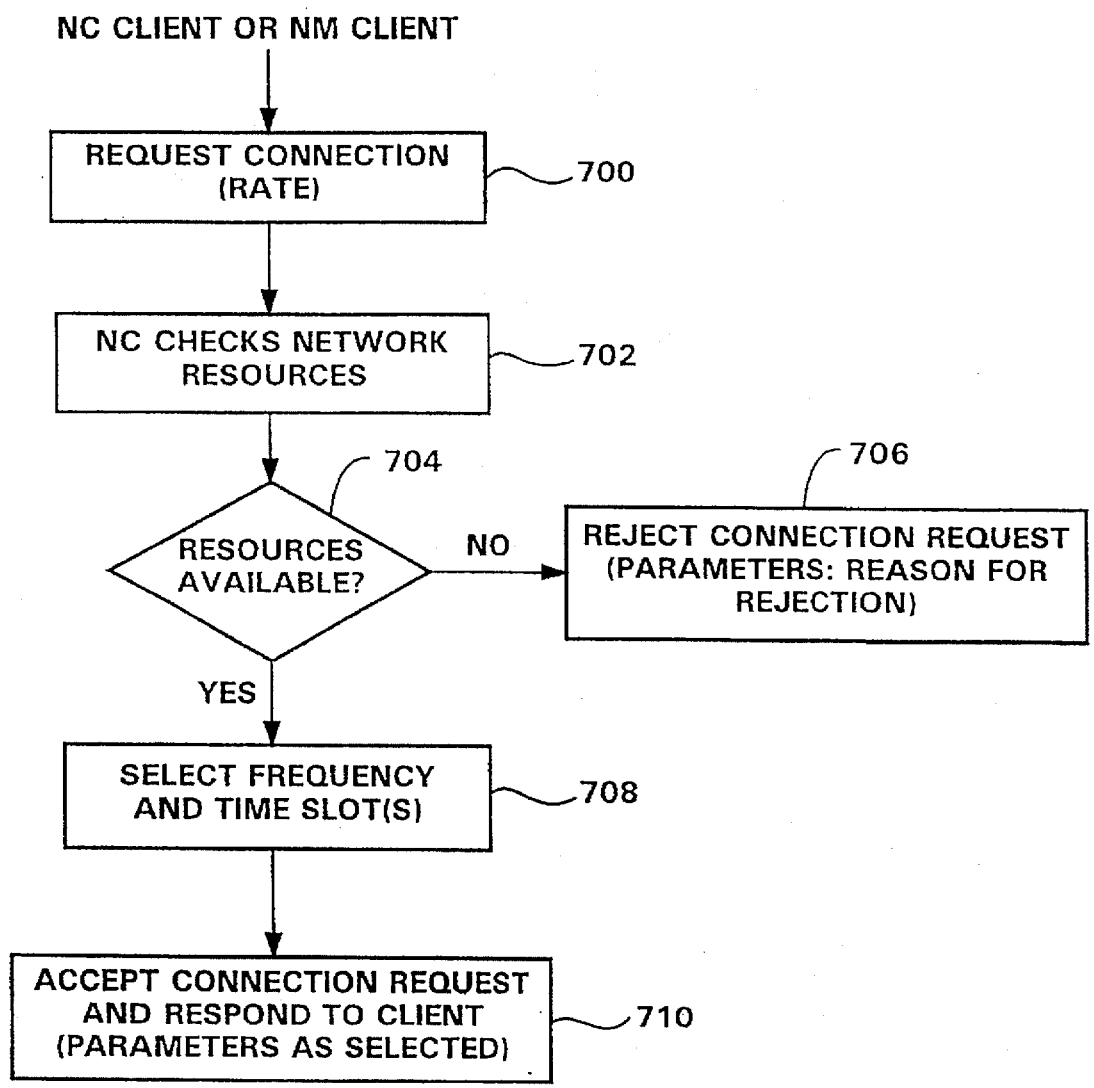
FIG. 9 is a flow diagram of the multi-rate dynamic time division multiple access component of the hybrid MAC system.

In the connection-oriented mode, where assigned dynamic multi-rate TDMA is used, the network controller 62 may assign a frequency and a time slot(s) 412 for the duration of the connection, (typical of applications benefiting from guaranteed bandwidth hence predictable latency, in support of interactive applications). Referring to FIG. 9, in this mode, a network controller client (e.g. ASEM 22), or a network module 70 client (e.g. an application within the STT 16) forwards a connection request (step 700) to the network controller 62 specifying which STT 16 is to be connected and the associated TDMA rate desired for that connection, (480 bps, and 2.4, 11.52, 14.2, 16, 19.2 15.36, 32, 56, 64, 112, 128 and 192 kbps. This rate is a function of the level of interactivity which is characteristic of the application. For isochronous services (video, telephony or POTs), the rates depend on the service itself (e.g. video, telephony using 64 kbps or 128 kbps).

The network controller 62 checks the available resources (step 702) to determine if the new request can be accommodated. If required resources (e.g. number of time slots 412) are not available (on any of the frequencies supporting the requested rate or lower multiples of that rate), the network controller 62 rejects the connection request specifying the reason (e.g. no available resources). If on the other hand the network controller 62 determines that the required resources are available (step 704) it reserves the selected time slots 412 within the appropriate frequency (step 708), informs the network module of such parameters, and returns to the client a confirmation to the connection request (step 710).

When the connection request is originated by ASEM 22, the request is forwarded on the network controller's 62 Ethernet port. When the request is forwarded by the STT 16, the network module 70 may forward the request on the default static TDMA channel or the RSR-DSA default TDMA channel (whichever is employed at the time within a given system).

The plain old polling (POP) component of the MAC system 400 is intended for applications that benefit from a store and forward system where collisions are expected but the latency associated with POP response is irrelevant. Additionally, it facilitates controlled communications for any diagnostic operation and presents a fall back communication method for diagnostic purposes should other components of the hybrid MAC system 400 fail.

If the MAC module 126 determines that POP is required, the data transmitter 142 is tuned to the POP frequency and a service message is placed in the transmit queue 134.

The polling service may be initiated periodically by the network controller 62 to instruct the STT 16 to purge their transmit queue 34, or a polling request may be transmitted by the STT 16. The transmit queue 134 operates as a first-in-first-out (FIFO) buffer which resides in the settop RAM 122. When an application or service requires to send a message upstream, the information is forwarded utilizing resources assigned to the connection supporting the application session. If the information is in response to a poll, the message is copied into the transmit queue 134.

The STT 16 transmits the FIFO entries when it receives the polling token, which is an instruction by the network controller 62 for the STT 16 to empty its transmit queue 134. The polling token is broadcast on all OBTM downstream channels and the STT 16 transmits on the polling channel frequency. When the network controller 62 carries out the polling cycle, it has no knowledge of the OBTM downstream frequency to which the STT is tuned. This necessitates sending the polling token on all downstream OBTM carriers for a given neighborhood. Once a STT 16 gets the token, it is permitted to empty its entire transmit queue 134. The objective is to minimize the number of individual polling cycles required to empty the STT's entire queue 134. The network controller 62 then reads the messages from the plurality of STTs 16.

In the preferred embodiment, each node 92 provides service to five hundred STTs 16. In this configuration, at least one upstream default channel is designated assigned static TDMA mode; at least one upstream default channel is allocated to the POP communicating node; and the remaining upstream channels are assigned dynamic multi-rate TDMA. RSR-DSA mode channels are allocated upon request. In any given implementation, the hybrid MAC components may reside on a single frequency. For example, a channel that has been designated as a TDMA channel may have a set of time slots 412 that belong to the static TDMA operation and another set that belong to the dynamic TDMA operation. This, however, leads to a more complex implementation within the network controller 62.

The hybrid MAC of the present invention supports isochronous and an isochronous multi-media communications data in a cost effective and efficient manner. In addition, connection-orientated as well as connectionless services have been supported, where the former requires a guaranteed bandwidth allotment over the duration of the connection.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

I claim:

1. A headend within a CATV communication system for providing communications between a plurality of information providers and a plurality of information user terminals comprising:

first control means for processing and routing broadcast and interactive downstream communications from said information providers to said user terminals, said downstream communications including a demand for the required downstream communicating bandwidth, wherein said first control means provides medium access control by allocating said demanded bandwidth;

second control means for providing medium access control for upstream communications by said user terminals to said information providers, said upstream communication including a demand for the required upstream communicating bandwidth; and interface means, located between said first and second control means and said user terminals, for transmitting said downstream and upstream communications.

2. The headend of claim 1, wherein said first control means includes means for receiving interactive communications from said information providers, means for receiving local broadcast control communications and means for combining said communications for transmission to said user terminals.

3. The headend of claim 1 wherein said first control means receives said broadcast and interactive communications, provides MPEG2 adaptation and originates in-band and out-of-band transport multiplex streams for transmission to the user terminals.

4. The headend of claim 1 wherein said second control means determines the type of medium access that is utilized.

5. The headend of claim 4 wherein said type of access includes plain old polling, default assigned TDMA and multi-rate assigned TDMA.

6. The headend of claim 4 wherein said interface means includes a QAM multiplexer/modulator for in-band downstream communications, a QPSK multiplexer/modulator for out-of-band downstream communications and a QPSK demodulator/multiplexer for upstream communications.

* * * * *

UNITED STATES PATENT AND TRADEMARK OFFICE
CERTIFICATE OF CORRECTION

PATENT NO. :     5,696,765                Sheet 1 of 2
DATED      :     December 9, 1997
INVENTOR(S):     Reem Safadi It is certified that error appears in the above-identified patent and that said Letters Patent is hereby corrected as shown below:

At column 2, line 55, after "x" a space should be inserted.

At column 4, line 12, delete "et" and insert therefor --yet--.

Table" and insert therefor --Map Table (PMT)--.

At column 12, line 4, delete "Art" and insert therefor --An--.

At column 12, line 5, delete "6" and insert therefor --16--.

At column 12, line 37, delete "o" and insert therefor --to--.

At column 12, line 53, delete "set" and insert therefor --sent--.

At column 13, line 29, delete "the-feeder" and insert therefor --the feeder--.

UNITED STATES PATENT AND TRADEMARK OFFICE
CERTIFICATE OF CORRECTION

PATENT NO. :     5,696,765                  Sheet 2 of 2
DATED      :     December 9, 1997
INVENTOR(S) :    Reem Safadi It is certified that error appears in the above-identified patent and that said Letters Patent is hereby corrected as shown below:

At column 16, line 27, delete "an isochronous" and insert therefor --anisochronous--.

At column 16, lines 42-43, after communication insert --s--.

At column 19, line 17, delete "34" and insert therefor --134--.

At column 19, line 33 after "STT" insert --16--.

At column 19, line 56, delete "an isochronous" and insert therefor --anisochronous--.

Signed and Sealed this

Fifth Day of May, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,696,765          Page 1 of 2

DATED : December 9, 1997

INVENTOR(S) : Reem Safadi

It is certified that error appears in the above-identified patent and that said Letters Patent is hereby corrected as shown below:

At column 2, line 55, after "x" a space should be inserted.

At column 4, line 12, delete "et" and insert therefor --yet--.

At column 12, line 4, delete "Art" and insert therefor --An--.

At column 12, line 5, delete "6" and insert therefor --16--.

At column 12, line 37, delete "o" and insert therefor --to--.

At column 12, line 53, delete "set" and insert therefor --sent--.

At column 13, line 29, delete "the-feeder" and insert therefor --the feeder--.

UNITED STATES PATENT AND TRADEMARK OFFICE
CERTIFICATE OF CORRECTION

PATENT NO. : 5,696,765
DATED : December 9, 1997
INVENTOR(S) : Reem Safadi

It is certified that error appears in the above-identified patent and that said Letters Patent is hereby corrected as shown below:

At column 16, line 27, delete "an isochronous" and insert therefor --anisochronous--.

At column 16, lines 42-43, after communication insert --s--.

At column 19, line 17, delete "34" and insert therefor --134--.

At column 19, line 33 after "STT" insert --16--.

At column 19, line 56, delete "an isochronous" and insert therefor --anisochronous--.

This certificate supersedes Certificate of Correction issued May 5, 1998

Signed and Sealed this

Twenty-first Day of July, 1998

Attest:

BRUCE LEHMAN

Attesting Officer

Commissioner of Patents and Trademarks